United States Patent
Ridgway et al.

(10) Patent No.: US 12,493,706 B2
(45) Date of Patent: *Dec. 9, 2025

(54) TRANSACTION DOCUMENT MANAGEMENT SYSTEM AND METHOD

(71) Applicant: Workshare, Ltd., London (GB)

(72) Inventors: Ben Ridgway, London (GB); Ted Sabety, New York, NY (US)

(73) Assignee: Workshare, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,207

(22) Filed: Aug. 7, 2023

(65) Prior Publication Data

US 2023/0376621 A1    Nov. 23, 2023

Related U.S. Application Data

(63) Continuation of application No. 15/219,693, filed on Jul. 26, 2016, now Pat. No. 11,763,013.

(Continued)

(51) Int. Cl.
*G06F 21/62* (2013.01)
*G06F 16/93* (2019.01)
(Continued)

(52) U.S. Cl.
CPC .......... *G06F 21/6218* (2013.01); *G06F 16/93* (2019.01); *G06F 40/169* (2020.01); *G06Q 10/103* (2013.01); *G06F 2221/2139* (2013.01)

(58) Field of Classification Search
CPC .... G06F 21/6218; G06F 16/93; G06F 40/169; G06F 2221/2139; G06Q 10/103
See application file for complete search history.

(56) References Cited

U.S. PATENT DOCUMENTS

| | | |
|---|---|---|
| 632,711 A | 9/1899 | Ganswindt |
| 823,723 A | 6/1906 | Guidinger |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

"3BClean" http://www.web.archve.org/web/20060216022833/http://www.3bview.com.

(Continued)

*Primary Examiner* — Stephen S Hong
*Assistant Examiner* — Carl E Barnes, Jr.
(74) *Attorney, Agent, or Firm* — NIXON PEABODY LLP; Janet Garetto; Sorinel Cimpoes

(57) ABSTRACT

This invention discloses a novel system and method for transaction document management where personnel from two sides of a business transaction involving one or more documents that constitute the transaction can interact with the system in order to automate the process of tracking executed signature pages associated with the documents. In addition, the system and method automates the tracking of exceptions to at least one of the documents and associating the exception with one or more documents comprising due diligence documents that may also reside on the system.

13 Claims, 4 Drawing Sheets

Related U.S. Application Data

(60) Provisional application No. 62/202,526, filed on Aug. 7, 2015.

(51) Int. Cl.
*G06F 40/169* (2020.01)
*G06Q 10/10* (2023.01)

(56) References Cited

U.S. PATENT DOCUMENTS

| | | |
|---|---|---|
| 4,479,195 A | 10/1984 | Herr |
| 4,949,300 A | 8/1990 | Christenson |
| 5,008,853 A | 4/1991 | Bly |
| 5,072,412 A | 12/1991 | Henderson |
| 5,220,657 A | 6/1993 | Bly |
| 5,245,553 A | 9/1993 | Tanenbaum |
| 5,247,615 A | 9/1993 | Mori |
| 5,293,619 A | 3/1994 | Dean |
| 5,379,374 A | 1/1995 | Ishizaki |
| 5,446,842 A | 8/1995 | Schaeffer |
| 5,608,872 A | 3/1997 | Schwartz |
| 5,617,539 A | 4/1997 | Ludwig |
| 5,619,649 A | 4/1997 | Kovnat |
| 5,634,062 A | 5/1997 | Shimizu |
| 5,671,428 A | 9/1997 | Muranaga |
| 5,699,427 A | 12/1997 | Chow |
| RE35,861 E | 7/1998 | Queen |
| 5,787,175 A | 7/1998 | Carter |
| 5,787,444 A | 7/1998 | Gerken |
| 5,801,702 A | 9/1998 | Dolan |
| 5,806,078 A | 9/1998 | Hug |
| 5,819,300 A | 10/1998 | Kohno |
| 5,832,494 A | 11/1998 | Egger |
| 5,890,177 A | 3/1999 | Moody |
| 5,897,636 A | 4/1999 | Kaeser |
| 5,898,836 A | 4/1999 | Freivald |
| 6,003,060 A | 12/1999 | Aznar |
| 6,012,087 A | 1/2000 | Freivald |
| 6,029,175 A | 2/2000 | Chow |
| 6,038,561 A | 3/2000 | Snyder |
| 6,049,804 A | 4/2000 | Burgess |
| 6,067,551 A | 5/2000 | Brown |
| 6,088,702 A | 7/2000 | Plantz |
| 6,128,635 A | 10/2000 | Ikeno |
| 6,145,084 A | 11/2000 | Zuili |
| 6,189,019 B1 | 2/2001 | Blumer |
| 6,212,534 B1 | 4/2001 | Lo |
| 6,219,818 B1 | 4/2001 | Freivald |
| 6,243,091 B1 | 6/2001 | Berstis |
| 6,263,350 B1 | 7/2001 | Wollrath |
| 6,263,364 B1 | 7/2001 | Najork |
| 6,269,370 B1 | 7/2001 | Kirsch |
| 6,285,999 B1 | 9/2001 | Page |
| 6,301,368 B1 | 10/2001 | Bolle |
| 6,317,777 B1 | 11/2001 | Skarbo |
| 6,321,265 B1 | 11/2001 | Najork |
| 6,336,123 B2 | 1/2002 | Inoue |
| 6,351,755 B1 | 2/2002 | Najork |
| 6,356,937 B1 | 3/2002 | Montville |
| 6,377,984 B1 | 4/2002 | Najork |
| 6,404,446 B1 | 6/2002 | Bates |
| 6,418,433 B1 | 7/2002 | Chakrabarti |
| 6,418,453 B1 | 7/2002 | Kraft |
| 6,424,966 B1 | 7/2002 | Meyerzon |
| 6,449,624 B1 | 9/2002 | Hammack |
| 6,505,237 B2 | 1/2003 | Beyda |
| 6,513,050 B1 | 1/2003 | Williams |
| 6,547,829 B1 | 4/2003 | Meyerzon |
| 6,556,982 B1 | 4/2003 | McGaffey |
| 6,560,620 B1 | 5/2003 | Ching |
| 6,584,466 B1 | 6/2003 | Serbinis |
| 6,591,289 B1 | 7/2003 | Britton |
| 6,594,662 B1 | 7/2003 | Sieffert |
| 6,596,030 B2 | 7/2003 | Ball |
| 6,614,789 B1 | 9/2003 | Yazdani |
| 6,658,626 B1 | 12/2003 | Aiken |
| 6,662,212 B1 | 12/2003 | Chandhok |
| 6,745,024 B1 | 6/2004 | DeJaco |
| 6,768,762 B2 | 7/2004 | Sparrow |
| 6,832,202 B1 | 12/2004 | Schuyler |
| 6,918,082 B1 | 7/2005 | Gross |
| 7,035,427 B2 | 4/2006 | Rhoads |
| 7,085,735 B1 | 8/2006 | Hall |
| 7,107,518 B2 | 9/2006 | Ramaley |
| 7,113,615 B2 | 9/2006 | Rhoads |
| 7,152,019 B2 | 12/2006 | Tarantola |
| 7,181,492 B2 | 2/2007 | Wen |
| 7,194,761 B1 | 3/2007 | Champagne |
| 7,212,955 B2 | 5/2007 | Kirshenbau |
| 7,233,686 B2 | 6/2007 | Hamid |
| 7,240,207 B2 | 7/2007 | Weare |
| 7,299,504 B1 | 11/2007 | Tiller |
| 7,321,864 B1 | 1/2008 | Gendler |
| 7,356,704 B2 | 4/2008 | Rinkevich |
| 7,434,164 B2 | 10/2008 | Salesin |
| 7,454,778 B2 | 11/2008 | Pearson |
| 7,496,841 B2 | 2/2009 | Hadfield |
| 7,564,997 B2 | 7/2009 | Hamid |
| 7,570,964 B2 | 8/2009 | Maes |
| 7,613,770 B2 | 11/2009 | Li |
| 7,624,447 B1 | 11/2009 | Horowitz |
| 7,627,613 B1 | 12/2009 | Dulitz |
| 7,640,308 B2 | 12/2009 | Antonoff |
| 7,673,324 B2 | 3/2010 | Tirosh |
| 7,680,785 B2 | 3/2010 | Najork |
| 7,685,298 B2 | 3/2010 | Day |
| 7,694,336 B2 | 4/2010 | Rinkevich |
| 7,707,153 B1 * | 4/2010 | Petito ............... G06Q 10/10 707/999.101 |
| 7,720,256 B2 | 5/2010 | Desprez |
| 7,730,175 B1 | 6/2010 | Roesch |
| 7,788,235 B1 | 8/2010 | Yeo |
| 7,796,309 B2 | 9/2010 | Sadovsky |
| 7,818,678 B2 | 10/2010 | Massand |
| 7,844,116 B2 | 11/2010 | Monga |
| 7,857,201 B2 | 12/2010 | Silverbrook |
| 7,877,790 B2 | 1/2011 | Vishik |
| 7,890,752 B2 | 2/2011 | Bardsley |
| 7,895,166 B2 * | 2/2011 | Foygel ............... G06F 16/93 707/786 |
| 7,903,822 B1 | 3/2011 | Hair |
| 7,941,844 B2 | 5/2011 | Anno |
| 7,958,101 B1 | 6/2011 | Teugels |
| 8,005,277 B2 | 8/2011 | Tulyakov |
| 8,042,112 B1 | 10/2011 | Zhu |
| 8,117,225 B1 | 2/2012 | Zilka |
| 8,145,724 B1 | 3/2012 | Hawks |
| 8,181,036 B1 | 5/2012 | Nachenberg |
| 8,196,030 B1 | 6/2012 | Wang |
| 8,201,254 B1 | 6/2012 | Wilhelm |
| 8,209,538 B2 | 6/2012 | Craigie |
| 8,286,085 B1 | 10/2012 | Denise |
| 8,286,171 B2 | 10/2012 | More |
| 8,301,994 B1 | 10/2012 | Shah |
| 8,316,237 B1 | 11/2012 | Felsher |
| 8,406,456 B2 | 3/2013 | More |
| 8,473,847 B2 | 6/2013 | Glover |
| 8,478,995 B2 | 7/2013 | Alculumbre |
| 8,555,080 B2 | 10/2013 | More |
| 8,572,388 B2 * | 10/2013 | Boemker ............... G06Q 10/10 713/168 |
| 8,620,872 B1 | 12/2013 | Killalea |
| 8,635,295 B2 | 1/2014 | Mulder |
| 8,732,127 B1 | 5/2014 | Roterdam |
| 8,776,190 B1 | 7/2014 | Cavage |
| 8,797,603 B1 | 8/2014 | Dougherty |
| 8,839,100 B1 | 9/2014 | Donald |
| 9,098,500 B1 | 8/2015 | Asokan |
| 9,311,624 B2 | 4/2016 | Diament |
| 9,652,485 B1 | 5/2017 | Bhargava |
| 2001/0018739 A1 | 8/2001 | Anderson |
| 2001/0039534 A1 | 11/2001 | Keene |
| 2001/0042073 A1 | 11/2001 | Saether |
| 2002/0010682 A1 | 1/2002 | Johnson |

(56) References Cited

U.S. PATENT DOCUMENTS

| | | |
|---|---|---|
| 2002/0016959 A1 | 2/2002 | Barton |
| 2002/0019827 A1 | 2/2002 | Shiman |
| 2002/0023158 A1 | 2/2002 | Polizzi |
| 2002/0052928 A1 | 5/2002 | Stern |
| 2002/0063154 A1 | 5/2002 | Hoyos |
| 2002/0065827 A1 | 5/2002 | Christie |
| 2002/0065848 A1 | 5/2002 | Walker |
| 2002/0073188 A1 | 6/2002 | Rawson, III |
| 2002/0087515 A1 | 7/2002 | Swannack |
| 2002/0099602 A1 | 7/2002 | Moskowitz |
| 2002/0120648 A1 | 8/2002 | Ball |
| 2002/0129062 A1 | 9/2002 | Luparello |
| 2002/0136222 A1 | 9/2002 | Robohm |
| 2002/0138744 A1 | 9/2002 | Schleicher |
| 2002/0159239 A1 | 10/2002 | Amie |
| 2002/0164058 A1 | 11/2002 | Aggarwal |
| 2003/0009518 A1 | 1/2003 | Harrow |
| 2003/0009528 A1 | 1/2003 | Sharif |
| 2003/0037010 A1 | 2/2003 | Schmelzer |
| 2003/0046572 A1 | 3/2003 | Newman |
| 2003/0051054 A1 | 3/2003 | Redlich |
| 2003/0061260 A1 | 3/2003 | Rajkumar |
| 2003/0061350 A1 | 3/2003 | Masouka |
| 2003/0078880 A1 | 4/2003 | Alley |
| 2003/0084279 A1 | 5/2003 | Campagna |
| 2003/0093755 A1 | 5/2003 | Ramakrishnan |
| 2003/0097454 A1 | 5/2003 | Yamakawa |
| 2003/0112273 A1 | 6/2003 | Hadfield |
| 2003/0115273 A1 | 6/2003 | Delia |
| 2003/0131005 A1 | 7/2003 | Berry |
| 2003/0147267 A1 | 8/2003 | Huttunen |
| 2003/0158839 A1 | 8/2003 | Faybishenko |
| 2003/0191799 A1 | 10/2003 | Araujo |
| 2003/0196087 A1 | 10/2003 | Stringer |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers |
| 2004/0031052 A1 | 2/2004 | Wannamaker |
| 2004/0122659 A1 | 6/2004 | Hourihane |
| 2004/0128321 A1 | 7/2004 | Hamer |
| 2004/0148567 A1 | 7/2004 | Jeon |
| 2004/0186851 A1 | 9/2004 | Uhingan |
| 2004/0187076 A1 | 9/2004 | Ki |
| 2004/0225645 A1 | 11/2004 | Rowney |
| 2004/0261016 A1 | 12/2004 | Glass |
| 2005/0021980 A1 | 1/2005 | Kanai |
| 2005/0038893 A1 | 2/2005 | Graham |
| 2005/0055306 A1 | 3/2005 | Miller |
| 2005/0055337 A1 | 3/2005 | Bebo |
| 2005/0071755 A1 | 3/2005 | Harrington |
| 2005/0108293 A1 | 5/2005 | Lipman |
| 2005/0138350 A1 | 6/2005 | Hariharan |
| 2005/0138540 A1 | 6/2005 | Baltus |
| 2005/0204008 A1 | 9/2005 | Shinbrood |
| 2005/0251738 A1 | 11/2005 | Hirano |
| 2005/0251748 A1 | 11/2005 | Gusmorino |
| 2005/0256893 A1 | 11/2005 | Perry |
| 2005/0268327 A1 | 12/2005 | Starikov |
| 2005/0278421 A1 | 12/2005 | Simpson |
| 2006/0005247 A1 | 1/2006 | Zhang |
| 2006/0013393 A1 | 1/2006 | Ferchichi |
| 2006/0021031 A1 | 1/2006 | Leahy |
| 2006/0047765 A1 | 3/2006 | Mizoi |
| 2006/0050937 A1 | 3/2006 | Hamid |
| 2006/0059196 A1 | 3/2006 | Sato |
| 2006/0064717 A1 | 3/2006 | Shibata |
| 2006/0067578 A1 | 3/2006 | Fuse |
| 2006/0069740 A1 | 3/2006 | Ando |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla |
| 2006/0184505 A1 | 8/2006 | Kedem |
| 2006/0190493 A1 | 8/2006 | Kawai |
| 2006/0218004 A1 | 9/2006 | Dworkin |
| 2006/0218643 A1 | 9/2006 | DeYoung |
| 2006/0224589 A1 | 10/2006 | Rowney |
| 2006/0236246 A1 | 10/2006 | Bono |
| 2006/0261112 A1 | 11/2006 | Todd |
| 2006/0271947 A1 | 11/2006 | Lienhart |
| 2006/0272024 A1 | 11/2006 | Huang |
| 2006/0277229 A1 | 12/2006 | Yoshida |
| 2006/0294468 A1 | 12/2006 | Sareen |
| 2006/0294469 A1 | 12/2006 | Sareen |
| 2007/0005589 A1 | 1/2007 | Gollapudi |
| 2007/0011211 A1 | 1/2007 | Reeves |
| 2007/0025265 A1 | 2/2007 | Porras |
| 2007/0027830 A1 | 2/2007 | Simons |
| 2007/0038704 A1 | 2/2007 | Brown |
| 2007/0094510 A1 | 4/2007 | Ross |
| 2007/0100991 A1 | 5/2007 | Daniels |
| 2007/0101154 A1 | 5/2007 | Bardsley |
| 2007/0101413 A1 | 5/2007 | Vishik |
| 2007/0112930 A1 | 5/2007 | Foo |
| 2007/0150443 A1 | 6/2007 | Bergholz |
| 2007/0179967 A1 | 8/2007 | Zhang |
| 2007/0192728 A1 | 8/2007 | Finley |
| 2007/0220061 A1 | 9/2007 | Tirosh |
| 2007/0220068 A1 | 9/2007 | Thompson |
| 2007/0253608 A1 | 11/2007 | Tulyakov |
| 2007/0261099 A1 | 11/2007 | Broussard |
| 2007/0261112 A1 | 11/2007 | Todd |
| 2007/0294318 A1 | 12/2007 | Arora |
| 2007/0294612 A1 | 12/2007 | Drucker |
| 2007/0299880 A1 | 12/2007 | Kawabe |
| 2008/0028017 A1 | 1/2008 | Garbow |
| 2008/0033913 A1 | 2/2008 | Winburn |
| 2008/0034282 A1 | 2/2008 | Zernik |
| 2008/0034327 A1 | 2/2008 | Cisler |
| 2008/0065668 A1 | 3/2008 | Spence |
| 2008/0080515 A1 | 4/2008 | Tombroff |
| 2008/0082529 A1 | 4/2008 | Mantena |
| 2008/0091465 A1 | 4/2008 | Fuschino |
| 2008/0091735 A1 | 4/2008 | Fukushima |
| 2008/0162527 A1 | 7/2008 | Pizano |
| 2008/0177782 A1 | 7/2008 | Poston |
| 2008/0215667 A1 | 9/2008 | Rothbarth |
| 2008/0219495 A1 | 9/2008 | Hulten |
| 2008/0235760 A1 | 9/2008 | Broussard |
| 2008/0263363 A1 | 10/2008 | Jueneman |
| 2008/0275694 A1 | 11/2008 | Varone |
| 2008/0288597 A1 | 11/2008 | Christensen |
| 2008/0301193 A1 | 12/2008 | Massand |
| 2008/0306894 A1 | 12/2008 | Rajkumar |
| 2008/0310624 A1 | 12/2008 | Celikkan |
| 2008/0320316 A1 | 12/2008 | Waldspurger |
| 2009/0008384 A1 | 1/2009 | Roux |
| 2009/0025087 A1 | 1/2009 | Peirson |
| 2009/0030997 A1 | 1/2009 | Malik |
| 2009/0034804 A1 | 2/2009 | Cho |
| 2009/0049132 A1 | 2/2009 | Gutovski |
| 2009/0052778 A1 | 2/2009 | Edgecomb |
| 2009/0064326 A1 | 3/2009 | Goldsein |
| 2009/0083073 A1 | 3/2009 | Mehta |
| 2009/0129002 A1 | 5/2009 | Wu |
| 2009/0164427 A1 | 6/2009 | Shields |
| 2009/0177754 A1 | 7/2009 | Brezina |
| 2009/0183257 A1 | 7/2009 | Prahalad |
| 2009/0187567 A1 | 7/2009 | Rolle |
| 2009/0216843 A1 | 8/2009 | Willner |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhaker |
| 2009/0319480 A1 | 12/2009 | Saito |
| 2010/0011077 A1 | 1/2010 | Shkolnikov |
| 2010/0011428 A1 | 1/2010 | Atwood |
| 2010/0017404 A1 | 1/2010 | Banerjee |
| 2010/0017850 A1 | 1/2010 | More |
| 2010/0049807 A1 | 2/2010 | Thompson |
| 2010/0058053 A1 | 3/2010 | Wood |
| 2010/0064004 A1 | 3/2010 | Ravi |

(56) References Cited

U.S. PATENT DOCUMENTS

| | | |
|---|---|---|
| 2010/0064372 A1 | 3/2010 | More |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary |
| 2010/0114991 A1 | 5/2010 | Chaudhary |
| 2010/0131604 A1 | 5/2010 | Portilla |
| 2010/0146382 A1 | 6/2010 | Abe |
| 2010/0174678 A1 | 7/2010 | Massand |
| 2010/0174761 A1 | 7/2010 | Longobardi |
| 2010/0186062 A1 | 7/2010 | Banti |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy |
| 2010/0287246 A1 | 11/2010 | Klos |
| 2010/0299727 A1 | 11/2010 | More |
| 2010/0318530 A1 | 12/2010 | Massand |
| 2010/0332428 A1 | 12/2010 | McHenry |
| 2011/0029625 A1 | 2/2011 | Cheng |
| 2011/0035655 A1 | 2/2011 | Heineken |
| 2011/0041165 A1 | 2/2011 | Bowen |
| 2011/0106892 A1 | 5/2011 | Nelson |
| 2011/0107106 A1 | 5/2011 | Morii |
| 2011/0125806 A1 | 5/2011 | Park |
| 2011/0141521 A1 | 6/2011 | Qiao |
| 2011/0145229 A1 | 6/2011 | Vailaya |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman |
| 2011/0264907 A1 | 10/2011 | Betz |
| 2011/0314384 A1 | 12/2011 | Lindgren |
| 2012/0011361 A1 | 1/2012 | Guerrero |
| 2012/0016867 A1 | 1/2012 | Clemm |
| 2012/0030563 A1 | 2/2012 | Lemonik |
| 2012/0036157 A1 | 2/2012 | Rolle |
| 2012/0079267 A1 | 3/2012 | Lee |
| 2012/0079596 A1 | 3/2012 | Thomas |
| 2012/0110092 A1 | 5/2012 | Keohane |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield |
| 2012/0233534 A1* | 9/2012 | Vanderwende ....... G06F 40/279 715/230 |
| 2012/0246115 A1 | 9/2012 | King |
| 2012/0260188 A1 | 10/2012 | Park |
| 2012/0265817 A1 | 10/2012 | Vidalenc |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston |
| 2013/0097421 A1 | 4/2013 | Lim |
| 2013/0212707 A1 | 8/2013 | Donahue |
| 2013/0227043 A1 | 8/2013 | Murakami |
| 2013/0227397 A1 | 8/2013 | Tvorun |
| 2014/0032489 A1 | 1/2014 | Hebbar |
| 2014/0115436 A1 | 4/2014 | Beaver |
| 2014/0136497 A1 | 5/2014 | Georgiev |
| 2014/0181223 A1 | 6/2014 | Homsany |
| 2014/0280336 A1 | 9/2014 | Glover |
| 2014/0281872 A1 | 9/2014 | Glover |
| 2015/0026464 A1 | 1/2015 | Hanner |
| 2015/0059003 A1 | 2/2015 | Bouse |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 102008002960 | 4/2008 |
| KR | 1020080029602 | 4/2008 |
| WO | WO 0060504 | 10/2000 |
| WO | WO 2001052473 | 7/2001 |
| WO | WO 2002101577 | 12/2002 |

OTHER PUBLICATIONS

"3BClean" Clean: What is the Problem? 3B is the solution http://web.archive.org/web/20051201012525/http://www.3bview.com/pages/index.php.
3B Transform from 2005 http://web.archive.org/web/20051216102451/http://ww.3bview.com/pages/3bclean.php.
3BOpen Doc Making StarOffice and OpenOffice.org a viable option http://web.archive.org/web/200608230829181http:llww.3bview.com/3bopendoc.html.
3BOpenDoc—Convert documents to and from OSF http://webarchive.org/web/20060623201104/http://www.3bview.com/3bopendoc.convert.ODF.html.
Advisory Action mailed Apr. 12, 2013 in co-pending U.S. Appl. No. 12/621,429 by More, S., filed Nov. 18, 2009.
Advisory Action mailed Nov. 1, 2013 in co-pending U.S. Appl. No. 13/659,793 by More, S., filed Oct. 24, 2012.
Bettenburg et al., An Empirical Study on the Risks of Using Off-the-Shelf Techniques for Processing Mailing List Data, 2009, IEEE 4 pages.
Bitform Extract SDK 2005.1 http://web.archive.org/web/20050830121253/http://bitform.net/products/securesdk/.
Bindu et al., Spam War: Battling Ham against Span, 2011 IEEE 6 pages.
Bobba et al., Attribute-Based Messaging: Access Control and Confidentiality, 2010, ACM 35 pages.
Chen et al., Online Detection and Prevention of Phishing Attacks, 2006, IEEE 7 pages.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.
Co-pending U.S. Appl. No. 13-659,793, filed Oct. 24, 2012.
Co-pending U.S. Appl. No. 13/659,817, filed Oct. 24, 2012.
"CS MAILsweeper™ 4.3 for SMTP" by Clearswift Ltd (© 2002) www.mimesweeper.com.
"EzClean-Metadata removal utility for Microsoft Office," http://web.archive.org/web/20040804113214/www.kklsoftware.com/products/ezClean/details.asp.
"EzClean—New Features—version3.3" http://web.archive.org/web/20040803203232/http://www.kklsoftware.com/products/ezClean/newfeatures.asp.
"EzClean—New Features" http://web.archive.org/web/20040804034917/http://www.kklsoftware.com'products/ezClean.
"EzClean FQ" http://web.archive.org/web/20040803202332/http://www.kklsoftware.com/products/ezClean/faq.asp.
EzClean version 3.3 Installation Guide and Admin Manual http://web.archive.org/web/20050201003914/http://www.kklsoftware.com/documentation/ezClean-AdminManual.pdf.

(56) References Cited

OTHER PUBLICATIONS

EzClean version 3.3 Integration Gude for use with CS MailSweeper for SMTP.
Final Office Action mailed Apr. 16, 2012 in U.S. Appl. No. 10/023,010, filed Dec. 17, 2001.
Final Office Action mailed Apr. 17, 2007 in U.S. Appl. No. 10/023,010, filed Dec. 17, 2001, Issued U.S. Pat. No. 7,496,841.
Final Office Action mailed Aug. 12, 2011 in U.S. Appl. No. 12/209,096, filed Sep. 11, 2008.
Final Office Action mailed Aug. 16, 2013 in co-pending U.S. Appl. No. 13/306,798 of Glover, R.W., filed Nov. 29, 201.
Final Office Action mailed Feb. 1, 2013 in U.S. Appl. No. 12/621,429 by More, S., filed Nov. 18, 2009.
Final Office Action mailed Jan. 18, 2013 in U.S. Appl. No. 12/844,818 by Glover, R., filed Jul. 27, 2010.
Final Office Action mailed Oct. 21, 2013 in U.S. Appl. No. 13/659,793 by More, S., filed Oct. 24, 2012.
Good et al., Usabili;ty and privacy: a study of KaZaA P2P file-sharing, Apr. 5-10, 2003, ACM, vol. No. 5, Issue No. 1, pp. 137-144.
Golimund, et al., Cryptree: A Folder Tree Structure for Cryptographic File systems, Oct. 2-4, 2006, IEEE, pp. 189-198.
"How do I make sure that there is no embarrassing Metadata in any documents that I attach to e-mails? ezClean makes it easy!" http://web.archive.org/web/20040727132558/http:/www.klsoftware.com.
International Search Report of PCT Application No. PCT/IB2002/005821, Jan. 30, 2004, 6 pages.
International Search Report of PCT Application No. PCT/2009/064919, Jul. 1, 2010, 3 pages.
International Search Report of PCT Application No. PCT/US2009/051313, Mar. 3, 2010, 3 pages.
International Search Report of PCT Application No. PCT/US2009/056631, Apr. 21, 2010, 3 pages.
International Search Report of PCT Application No. PCT/US2009/056668, Apr. 16, 2010, 9 pages.
International Search Report of PCT Application No. PCT/US2009/064919, Jul. 1, 2010, 3 pages.
International Search Report of PCT Application No. PCT/US2009/065019, Jun. 4, 2010, 6 pages.
International Search Report of PCT Application No. PCT/US2010/043345, Apr. 28, 2011, 3 pages.
Jain, Pravin, The class of JAVA, Aug. 12, 2010.
Johnson et al., The Evolution of the Peet-to-Peer File Sharing Industry and the Security Risks for Users, Jan. 7-10, 2008, IEEE, pp. 1-10.
Karnouskos et al., Active Electronic Mail, 2002, ACM 6 pages.
Kaushik et al., Email Feedback: A Policy based Approach to Overcoming False Positives, 2005, 10 pages.
"Lotus Announces cc:Mail For The World Wide Web; Provides Easy Access to E-Mail Via The Web" http://www.thefreelibrary.com/print/printarticle.aspx?id=17465051.
"Middleboxes: Taxonomy and Issues," Internet Engineering Task Force (IETF), RFC 3234 (Feb. 2002).
"MIME (Multipurpose Internet Mail Extensions): Mechanisms for Specifying and Describing the Format of Internet Message Bodies," Internet Engineering Task Force (IETF), RFC 1341 (Jun. 1992).
"MIMEsweeper Solutions" https://web.archive.org/web2002020211234/http://www.minesweeper.com/products/default.asp.
Monga et al., Perceptual Image hashing via feature points: performance evaluation and tradeoffs, IEEE Transactions on Image Processing, 15(11)(2006), pp. 3453-3466.
Monga, "Robust Perceptual Image Hashing Using Feature Points," http://bluecoat-02/?cfru=a1-HR0cDovL3NpZ25hbC51Y2UudXRleGFzLmVkdS9+dmlzaGFs-L2hhc2gtcGFydEkucHM=, 2003.
Microsoft, "Microsoft XP, Product Guide," pp. 1-26, 2001.
Non-final Office Action mailed Dec. 6, 2012 in U.S. Appl. No. 13/306,798, filed Nov. 29, 2011.
Non-final Office Action mailed Oct. 30, 2014 in U.S. Appl. No. 13/799,067.
Non-final Office Action mailed Apr. 26, 2013 in U.S. Appl. No. 13/659,817, filed Oct. 24, 2012.
Non-final Office Action mailed Apr. 27, 2012 in U.S. Appl. No. 12/275,185, filed Nov. 20, 2008.
Non-final Office Action mailed Mar. 11, 2011 in U.S. Appl. No. 12/209,096, filed Sep. 11, 2008.
Non-final Office Action mailed Aug. 1, 2012 in U.S. Appl. No. 12/621,429, filed Nov. 18, 2009.
Non-final Office Action mailed Aug. 13, 2013 in U.S. Appl. No. 13/306,819, filed Nov. 29, 2011.
Non-final Office Action mailed Dec. 22, 2011 in U.S. Appl. No. 12/209,082, filed Sep. 11, 2008.
Non-final Office Action mailed Mar. 1, 2006 in U.S. Appl. No. 10/023,010, filed Dec. 17, 2001.
Non-final Office Action mailed Mar. 18, 2013 in U.S. Appl. No. 13/659,793, filed Oct. 24, 2012.
Non-final Office Action mailed Mar. 20, 2006 in U.S. Appl. No. 10/136,733, filed Apr. 30, 2002.
Non-final Office Action mailed May 7, 2007 in U.S. Appl. No. 10/023,010, filed Dec. 17, 2001, issued U.S. Pat. No. 7,496,841.
Non-final Office Action mailed Sep. 19, 2011 in U.S. Appl. No. 12/177,043, filed Jul. 21, 2008.
Non-final Office Action mailed Jan. 9, 2012 in U.S. Appl. No. 12/177,043, filed Jul. 21, 2008.
Non-final Office Action mailed Sep. 19, 2012 in U.S. Appl. No. 12/844,818, filed Jul. 27, 2010.
Notice of Allowance mailed Aug. 19, 2012 in U.S. Appl. No. 12/177,043, filed Jul. 21, 2008.
Notice of Allowance mailed Jun. 26, 2012 in U.S. Appl. No. 12/275,185, filed Nov. 20, 2008.
Notice of Allowance mailed Jul. 8, 2013 in U.S. Appl. No. 12/209,082, filed Sep. 11, 2008.
Notice of Allowance mailed Mar. 13, 2013 in U.S. Appl. No. 12/844,818, filed Jul. 27, 2010.
Notice of Allowance mailed Oct. 24, 2012 in U.S. Appl. No. 12/275,185, filed Nov. 20, 2008.
Notice of Allowance mailed Sep. 25, 2013 in U.S. Appl. No. 13/659,817, filed Oct. 24, 2012.
PC Magazine "Pure Intranets: Real-Time Internet Collaboration," Aug. 30, 2001, 2 pages, http://www.zdnet.com/pcmag/featuresgroupware/gpwst.htm.
Restriction Requirement mailed Feb. 14, 2005 for U.S. Appl. No. 10/023,010, filed Dec. 17, 2001, Issued U.S. Pat. No. 7,496,841.
Restriction Requirement mailed Feb. 5, 2008 for U.S. Appl. No. 10/023,010, filed Dec. 17, 2001, Issued U.S. Pat. No. 7,496,841.
Restriction Requirement mailed Jun. 30, 3006 for U.S. Appl. No. 10/136,733, filed Apr. 30, 3003.
Roussev et al., "Integrating XML and Object-based Programming for Distributed Collaboration," IEEE, 2000, pp. 254-259.
Roy et al., "Robust Hash for Detecting and Localizing Image Tampering," Image Processing, 2007, ICIP 2007, IEEE International Conference, vol. 6, pp. VI-117-VI-120, Sep. 16, 2007-Oct. 19, 2007.
Silver et al., Plan to Deal with Metadata Issues with Windows Vista, Gartner, Inc., Dec. 21, 2005, ID No. G00136321.
"Simple Mail Transfer Protocol," Internet Engineering Task Force (IEF), RFC 821 (Aug. 1982).
Stolfo et al., AMT/MET: Systems for Modeling and Detecting Errant Email, 2003, IEEE 6 pages.
"Think Your Deletions are Gone Forever? Thing Again! ezClean Makes Metadata Removal Easy!" http://web.archive.org/web/20040727132558/http:/www.kklsoftware.com.
Tulyakov et al., Symmetric Hash Functions for Fingerprint Minutiae, International Workshop on Pattern Recognition for Crime Prevention, Security and Surveillance, Bath U.K., ICAPR 2005, LNCS 3687, pp. 30-38.
U.S. Appl. No. 13/789,104, filed Mar. 7, 2013, Gofman.
Voida et all., Share and Share Alike: Exploring the User Interface Affordances of File Sharing, Apr. 22-27, 2006, ACM, pp. 1-10.
Weiss et al., Lightweight document matching for help-desk applications, In: Intelligent Systems and their Applications, IEEE, vol. 15, Issue 2, pp. 57-61, ISSN 1094-7167, 2000.

(56) References Cited

OTHER PUBLICATIONS

Wells et al., "Groupware & Collaboration Support," www.objs.com/survey/groupwar.htm, Aug. 30, 2001, 10 pages.
Workshare Ltd. Workshare Protect 4.5 Admin Guide, (c) 2006.
Written Opinion of PCT Application No. PCT/US2009/051313, Mar. 3, 2010, 3 pages.
Written Opinion of PCT Application No. PCT/US2009/064919, Jul. 1, 2010, 4 pages.
Written Opinion of PCT Application No. PCT/US2009/056668, Apr. 16, 2010, 4 pages.
Written Opinion of PCT Application No. PCT/US2009/065019, Jun. 4, 2010, 5 pages.
Written Opinion of PCT Application No. PCT/US2010/043345, Apr .. 28, 2011, 4 pages.
Written Opinion of PCT Application No. PCT/US2009/056651, Apr. 21, 2010, 5 pages.
XP-002257904, "Workshare Debuts Synergy," 2003, 3 pages.
Xuefeng et al., "Fingerprint Matching Using Minutia Polygons," Pattern Recognition, 2006, ICPR 2006, 18$^{th}$ International Conference on, vol. 1 pp. 1046-1049.
Yung et al., "Generating Robust Digital Signature for Image/Video Authentication," Multimedia and Security Workshop at ACM Multimedia '98, Bristol, U.K., Sep. 1998.

\* cited by examiner

TRANSACTION DOCUMENT MANAGEMENT SYSTEM AND METHOD

CROSS-REFERENCE TO RELATED APPLICATIONS

This application is a continuation of U.S. patent application Ser. No. 15/219,693, filed on Jul. 26, 2016, now allowed, which claims priority to and the benefit of U.S. Provisional Application No. 62/202,526, filed on Aug. 7, 2015, each of which is hereby incorporated by reference in the present application.

FIELD OF INVENTION

The present invention generally relates to the field of transaction document management, and document management systems that may be operated by both sides of a transaction in order to automate the tedious and error-prone process of confirming executed signature pages, assembling closing sets of documents and associating exception lists in the documents to locations in the documents to which the exception applies or locations in a virtual document room where other documents associated with the exception may be located.

BACKGROUND

It is a tedious process for lawyers to manage multiple documents involved in a complex business transaction. For example, the execution of agreements in legal transactions can involve many documents with different signatories. In virtual closings, agreements are typically circulated to signatories to execute. Signatories will often return (by email) just the execution signature pages rather than the whole agreement as executed by them or the whole agreement as executed by them. The lawyer will then be required to collate each signatories' signed pages in the case of multiple signatories and combine these together into a fully executed agreement or in the case of a single signatory, combine the signature page with the agreement to form the executed agreement. Keeping check of the circulation of executable agreements and the receipt of signature pages to such agreements by multiple parties is typically monitored by the circulation of email and running ad-hoc document checklists.

It is also a tedious and error prone process for a lawyer to manage the interaction between due diligence documents uploaded to a data room and the list of representations and warranties that the lawyer has to review in a transaction document. These interact in a particular way: typically the lawyer has to determine if a given representation and warranty being made by the client has an exception to it. For example, the deal document may say "Except as noted in the Exceptions List, attached hereto as Exhibit A, the following representations and warranties are true and correct." Then there is the list of representations and warranties. One might be "There are no agreements licensing out Company's intellectual property." This may have an exception of a patent license to BigCo. That patent license has presumably been uploaded into the data room. And now the lawyer has to be sure that a reference to that license is associated with that representation in a document that will become the Exhibit A, Exceptions List. The lawyers on the other side, on review of the exception list, will want an easy way to link to those due diligence documents as they review the deal, in this case, the patent license document to BigCo. Some deals have hundreds of these exceptions. Therefore, a system and method of keeping track of agreements forming a legal transaction by organizing the exceptions list and execution of these agreements is needed.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Figure 1:
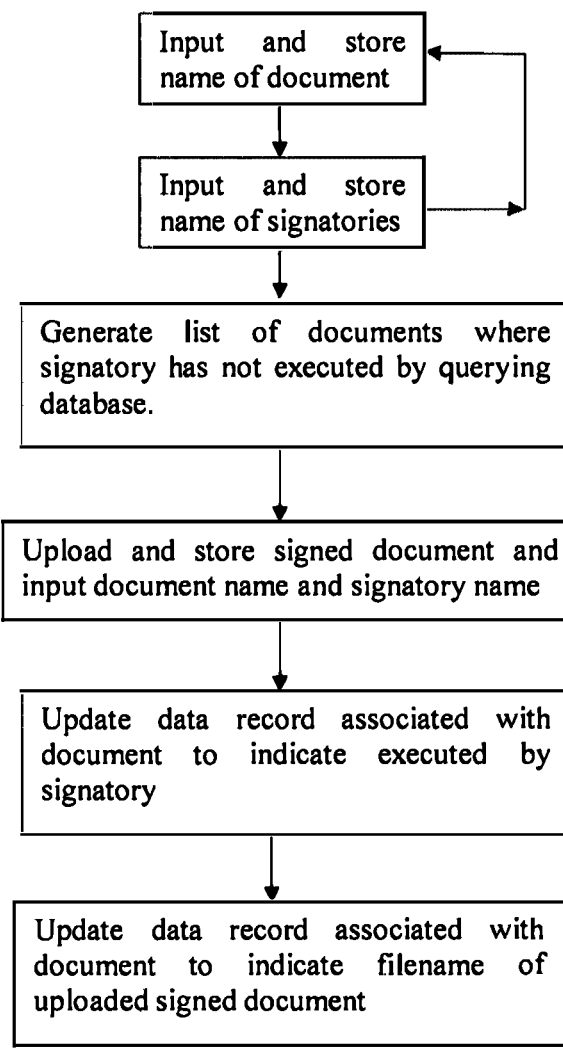
FIG. 1. Basic flowchart for tracking signature pages.
Figure 2:
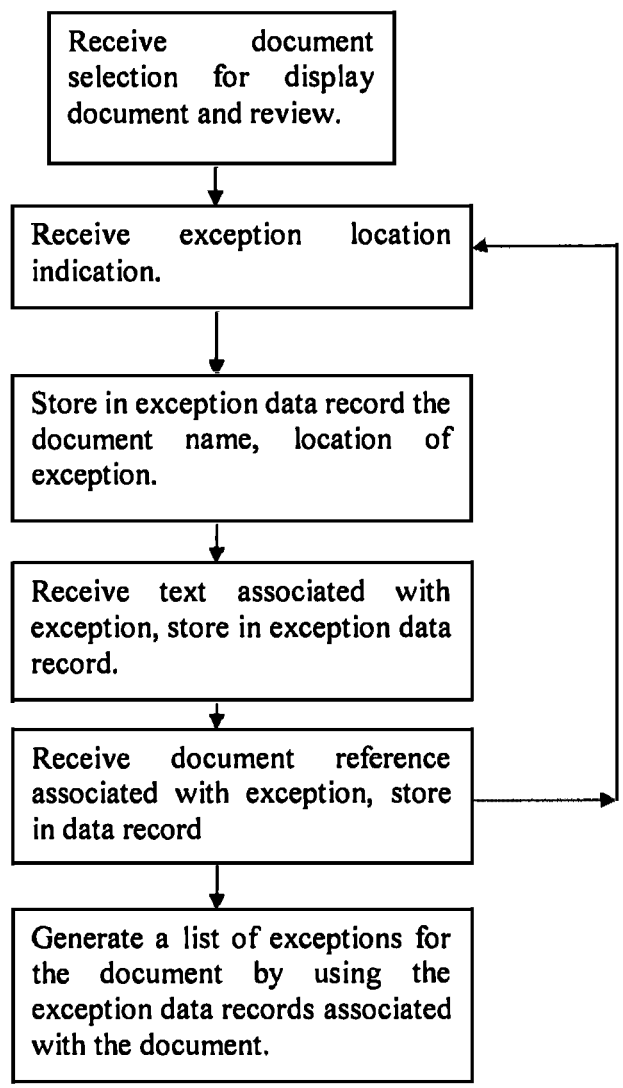
FIG. 2. Basic flowchart for tracking exceptions.
Figure 3:
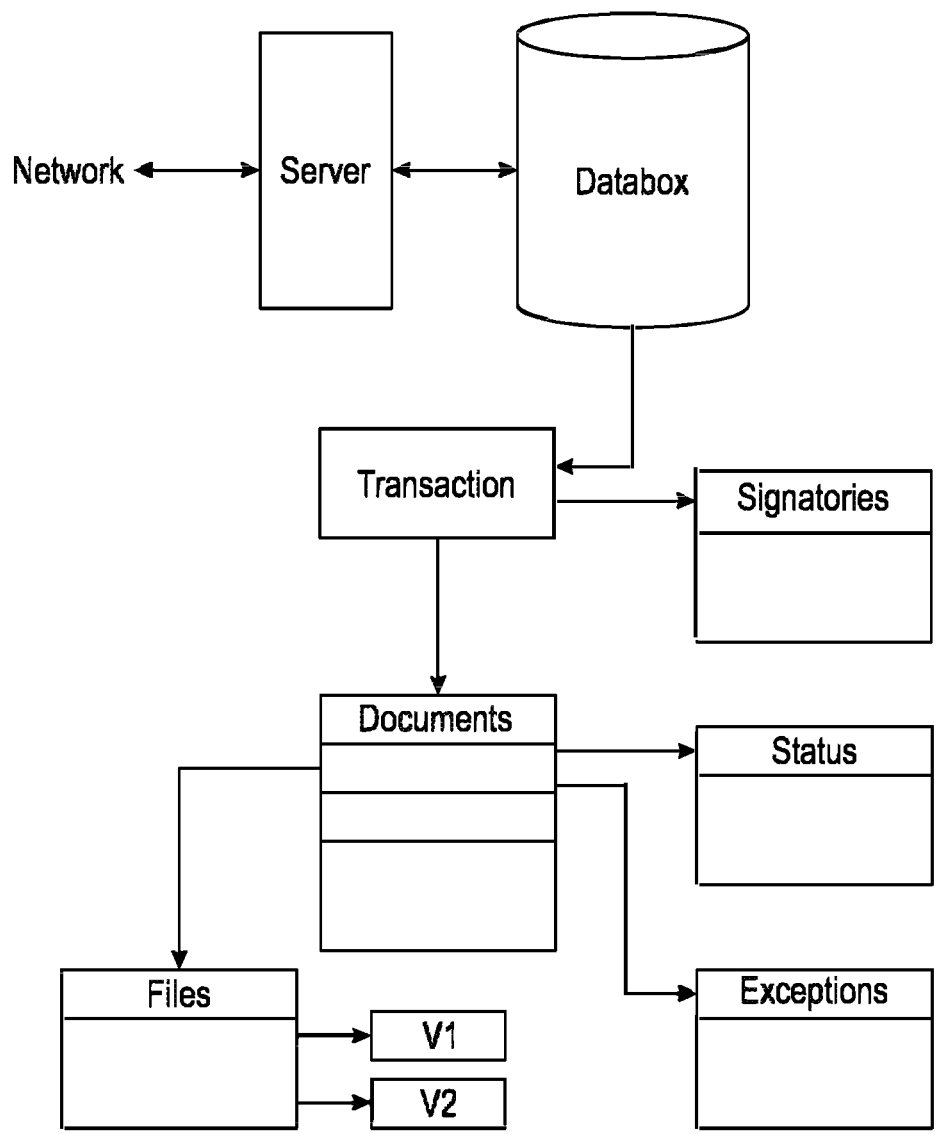
FIG. 3. Basic system architecture.
Figure 4:
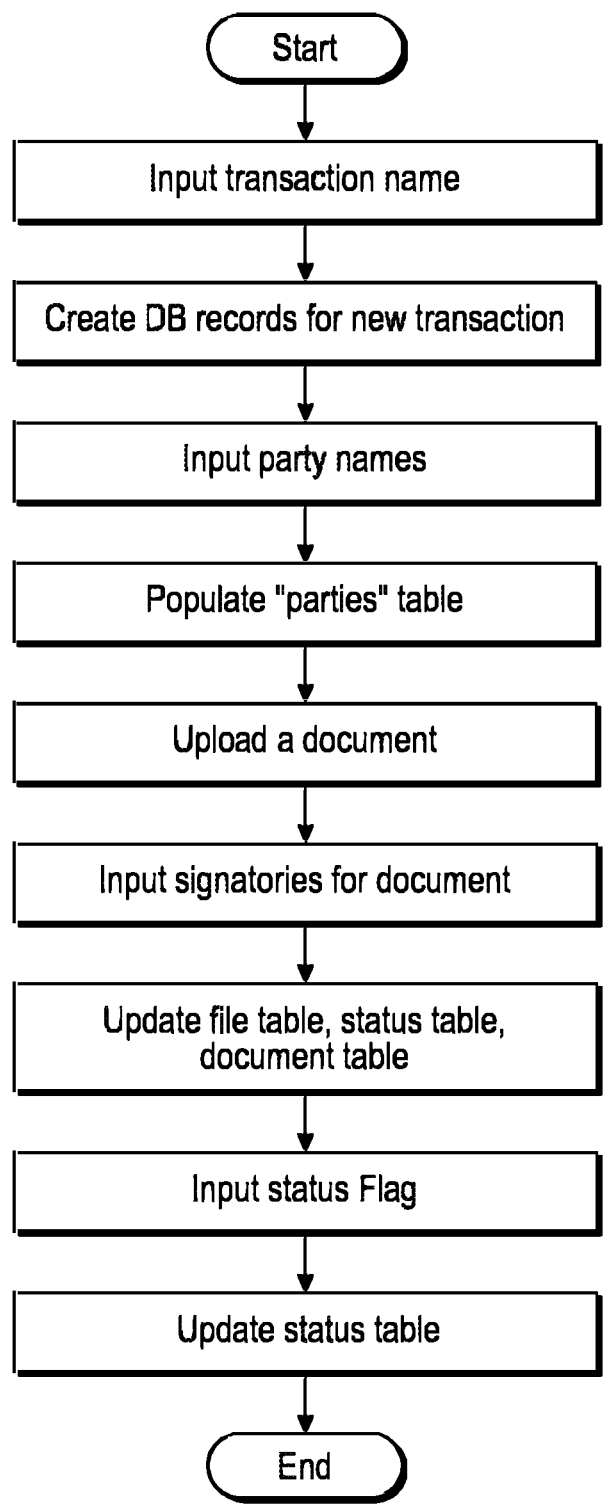
FIG. 4. Basic Flowchart for Initiating a Transaction.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The document management system operates using one or more remote computers that access a server through the use of a data network that connects the remote computers to the server. Alternatively, the users can use simple computer terminals and access the server using so-called dumb-terminal access. Other topologies of interconnection are possible by simply moving various processes from one machine to another.

In one embodiment, a server is comprised of a database that itself is comprised of one or more data records. These may be rows in relational tables or other types of database architecture. The invention will be described assuming that the database is implemented as relational tables. In this embodiment the system's database is comprised of several tables:

Parties table: This table is a list of names, in the form of text, who are designated as signatories to the transaction. The parties table may also indicate for each signatory name the name of the party they are associated with.

Document table: This table is a list of names of the documents that comprise the transaction. The document table may indicate in one or more columns for each document the parties to the document.

Parties—Document table: This table is a relational join table that identifies the signatories for each Document.

Document files table: This table lists for each document, the filenames and locations associated with each transaction document. There may be more than one file associated with the document. For example, a given document may have a reference to an "execution version" associated with the document or a "signature page" file associated with the document or an "executed signature page" file associated with the document.

The system utilizes a user interface, which is displayed on a user's computer by means of scripts or other code, typically executed by a browser program operating on the user's computer. This user interface facilitates the input of information by a user, selection of data object by a user, and the display of documents and other data on the user's computer. Using the user interface, a user may:

1. Input as text data the signatories to the agreements(s) (party name or abbreviation). The user actuates a keyboard on their computer, which populates indicated display boxes on the browser, and the browser transmits this data to the server. As a result, the server, having received the information, can store the information in the appropriate table described above, e.g. the signatories table. In one embodiment, the user has logged into the system using authentication information that associates the user with one of the parties to the transaction. As a result, the system only permits the user to add signatories associated that are associated with that party.

2. Input each agreement making up the transaction (document title) and, where necessary, select from the list of signatories the signatories required to execute the agreement(s). Based on this interaction, the system can populate the document table.

3. The user can then upload (or input a designation of a version draft) the file which comprises the execution version of each agreement to be signed by the parties to the GUI. This step designates the document as having a logical state of being "ready for execution." This logical state is a variable associated with the document in the database.

4. The system can then receive a file, typically an image file, that is a signed version of an agreement. This may be the entire agreement or just the signature page. The user interface can present as a pull-down menu a selection of which document the uploaded file is to be associated with and any pertinent notes, which may also be stored in the database in a data record associated with the document. One selection can be "executed signature page." Upon that selection, the GUI can present the user by pulldown menu a list of signatories that the user can select. In one embodiment, the user has logged into the system using authentication information that associates the user with one of the parties to the transaction. As a result, the system then presents in the pulldown selection menu, only those signatories associated with that party.

By this mechanism, the database is updated to reflect that the specific agreement was signed by that signatory. Once the user uploads a signature page to the relevant section of the checklist GUI which organizes that particular agreement's files and check off from the list of parties shown which party or parties the signature page belongs to. By doing so, the system updates a running checklist of upload signature pages for each agreement, allowing users to clearly see collected and outstanding signatures for each agreement in the transaction.

5. Additionally, upon upload of a document file, the user can designate a flag or tag to be associated with the uploaded signature page to indicate its status, such as "for review", "held in escrow", "held to order", "released". The flag would be a variable whose value represents one of these conditions.

6. The user can query the checklist by signatory to filter all signature pages belonging to such signatory or agreements where such party is yet to have a signature page uploaded in its name. Alternatively the system can present through the GUI a list of incomplete documents (the designation "ready for signature"=0) or a list of documents ready for signature ("ready for signature"=1), or a list of persons who have not completed their signatures, or a list of documents where signatures have been submitted, but are held in escrow or under review as noted in step 5. Any of the foregoing logical combinations can be selected so that a user can easily organize the completion of transaction documents and their proper execution.

It is important to note that access to the database has to be carefully controlled at several levels. Not all persons with access to the system have permission to access all of the data in the database. Rather, a person has to be authorized to view data associated with the transaction. In addition, a person who has read access has write access limited to one side of the deal. For example, a buyer and seller may have their respective personnel who have read access to the database tables associated with the transaction between buyer and seller. However, only buyer's personnel have permission to alter the signatory entries associated with the buyer, and likewise for the seller. Therefore, before any entry into or change of data in a data table received from a user interface has to be checked to confirm the identity of the user and whether the user has write privilege access to that portion of the database data table. In addition, a user associated with a party may have privilege to view documents or upload documents, but not alter the signatory table at all.

One critical security step is the upload of the executed copy of an agreement, or its signature page. In some cases, the entire document is scanned with the signed signature page. In other cases, a signature page is uploaded alone. The system GUI presents the uploading user the choice of selecting which it is. In the case of an entire document, the GUI permits the user to input the page number in the file where the signature page may be found. This data is stored in the database in the data record associated with that agreement document. For users of junior privilege, that privilege may permit the user to upload the scanned executed document or signature page. However, given their junior status, the system will automatically designate that execution version as "for review" but not permit the junior user to designate the document as "executed" by the party. This junior user might be a lawyer's secretary. This means that a more senior user of the same party will have to view the document in order to change the state of "for review" to "executed." That senior user might be a lawyer on the transaction representing the party. When a given agreement in the list has all signatories set to "executed", an additional logical value can be set and associated with the agreement representing the state of "completed." When all documents comprising the transaction are in the "completed" state, the entire transaction can have a logical state updated to indicate that the transaction is "closed."

In other embodiments of the invention, to help map the execution version of an agreement and standalone signature pages, the system will provide users with the ability to programmatically insert a visible or scannable code to the document, for example, on a cover page, header or footer or back page of the execution version of the document This code could be a UUID or barcode. In one embodiment, this code appears on the signature page. When this is done, the document table in the database is updated to associate that document with that specific code. This will allow (1) users to easily match standalone signature pages with their execution version counterpart and (2) the system to automatically recognize which agreement any uploaded signature page belongs to without the user assigning it to a particular agreement at the point of upload. In this way, signature pages can be uploaded in bulk and programmatically separated and assigned to the relevant agreements en masse. For each scanned upload of a signature page, the system can inspect the image to detect the barcode. The barcode value is matched using a database query and as a result of the matching, the system can determine how to update the document status values and further, associate the uploaded file location with the correct database entries for the document.

In another embodiment, the system can provide signature pack generation. In this embodiment, the user bookmarks/tags the relevant pages of a series of documents to be signed for any given party. For example, when the user uploads an execution version of a document, the GUI can permit the user to designate the page number of the signature page. This may be done by inputting the page number or inserting into the document on the signature page a meta-tag that the system can identify as marking the signature page. The existence of the tag can be stored in the database automatically by the system and associated with the document by using the name of the document. Once tagged the user can generate a single PDF signature pack for that party comprising the first page of each agreement (to help identify the agreement) and the signature page(s) for each agreement. In this process, the system fetches from each executed version of each document in the transaction the signature pages indicated by the tag. But the system can filter that by first selecting only those documents where a particular party is a party to that agreement. In this way, a user associated with a party can request that the system generate an output file that contains only the signature pages for that party.

In another aspect of the invention, the system can be adapted to track exceptions in one or more documents and to associate each exception with another document that can reside in a data room. A data room can be a logical location on the system, for example, a directory on the file storage system, where data files embodying information associated with the transaction are located. These are typically distinct from the transaction documents themselves. For example, property deeds, patents and other background legal documents may be stored in the data room for review by authorized users. The database is adapted to have a due diligence document table which associates each due diligence document in the data room with a title for the document and its location in the data room. Additional information may be associated with a due diligence document as further described below.

An agreement comprising a transaction may require reference to an exception. Therefore, the database is adapted to have an exception table. Each exception can be represented by a row in one or more relational tables, with the following attributes:

Exception Table:
  Exception No./Exception Note text/Due Dili Doc/Document
  The Exception No. is a unique index number for a specific excetion.
  The Exception Note is text input that the user drafts and inputs to explain the exception.
  The Due Dili Doc is a hyperlink, pointer or other reference to a document stored in the data room that is associated with the exception. This may be null if there is none.
  The Document entry is a reference to the transaction agreement that the exception is associated with.
Document Exception Table:
  Exception no. Document pointer/Doc. Ref./Doc. Bookmark.
  Document pointer: this refers to the family of files comprising the relevant deal document in the system where the representation or warranty is being made.
  Document reference: this is a text input of the document section number where the representation is being made and the exception applies to.
  Document bookmark: this is an optional hyperlink/bookmark that the system can use to automatically display the specific location in the document where the exception applies.

The transaction document management system is adapted to use the user interface, or GUI, to populate these tables. For example, a user may review an agreement and identify a statement to which an exception should apply. The user can then select an input into the GUI, which transmits a command up to the server to cause a new row in the exception table to be created (or some other data record to be associated with the exception). An exception index number is then created sequentially and stored in the table. The user interface then receives through a text input window an explanatory text input by the user. This is transmitted up to the server and gets stored in the Exception text entry of the table. In addition, a new row is created in the document exception table. The row has the exception index that has been created and the reference of the document being review to which the exception applies. The user can either manually enter the agreement section number reference, which also gets stored in the exception table in the row associated with the the document. Alternatively, the user can select using a cursor on a location of the displayed document, where the exception applies. In this case, the GUI obtains an internal reference in the document which is then transmitted to the server and stored in the document exception table.

The user interface also permits the reviewing user to open a selection box that presents a list of the documents in the data room. The user can then select a document from that list, and that selection is then stored in the exception table in a row associated with the exception so that the exception now can be associated with that document in the data room that is relevant to it.

In one embodiment, the user workflow with the system is described as follows:
  As the user reads through a deal document with representations or warranties, the user does the following when he/she decides that there is an exception to the representation:
  User presses a radio button on the gui: Add Exception.
  It opens a window for text input, and user inputs section number.
  Or, user clicks on a location in the displayed document, system inputs the hyperlink and generates the section number text input automatically, and the system populates the entries in the GUI.

System opens another text input window

User inputs explanation text or cancel if there is no text to add.

User reviews, clicks OK and a the text is stored in locally, using the GUI.

GUI displays the entire exception entry, i.e. the document name, section number and text explanation.

User clicks OK for the entire exception entry, and the system creates a new row entry in the Exception and Document Exception tables using that data. The system generates column entries, e.g. pointer to document, text section reference, book mark reference.

System displays through the GUI a radio button "add data room reference"

User clicks, which opens a browse window automatically showing the root of the due diligence data room directory associated with the transaction.

User selects appropriate folder or file, clicks OK, then the system then takes the reference to that file or folder and inputs it into the row of the exception table.

In another embodiment, the system can have the due diligence document reference link to a location in the due diligence document. In this embodiment:

System opens text box window, user types in section number of due dili doc., or cancel. Alternatively, the system displays the due diligence document, user moves their cursor or scrolls to the appropriate location, clicks, and the system generates a section number text item and bookmark location, and populates the entries in the GUI. In yet another embodiment, the user can select a rectangular region in the due diligence document to be associated with the exception and have the coordinates of that rectangle stored in the exception table. When the user clicks OK, the system populates the row of the exception entry with those references.

Generating the Exception List Exhibit Output:

The system has a GUI selection item that will generate a new document, called the Exceptions List. This document is cross referenced in the system with the transaction and the specific document in the deal it relates to. Therefore, each row in the Exception table has a transaction reference it has a Exception List No./Deal reference/Document reference/file pointer as columns. The system essentially squashes the relational tables into one flat table, where each exception is listed in the order of the section numbers of the document. In other words, the system applies a sorting process where the exceptions are listed by section number in the document. The formatting can be automatically applied based on a selected formatting template, much as auto-formatting is done in Microsoft Word:

---

Title of Document
  Section Number in Document.
    Text of Exception Explanation
      Title of related Due diligence document
        Text of relevant section number of due diligence document.

---

In another embodiment, the exception generating process can use the links to bookmarks in the due diligence document to select the relevant region of the due diligence document and insert that region either as text or an image, into the exception list output document. The automatically generated output can be a Word document, so it may be edited at that point, or edits can be input into the text boxes of the system and the output regenerated. In some embodiments, the entire exception list for the transaction can be compiled into one output document.

The Other Side of the Deal:

The users reviewing the exception list can open a window on the GUI that shows a list of the exceptions. For example, they may open on the system the deal document itself. At that point a menu selectin may be available on the GUI that permits them to open another window with the exception list. Alternatively, there may be a visual indicator in the deal document display noting that an exception applies to the text at that location in the deal document. The user then clicks on the exception flag, and a window opens showing the text of the exception, and under it a hyperlink to the document in the due diligence data room. The reviewing user can click "OK" to move on, or click on the hyperlink to have that document open. If there is a book mark related to the due diligence document, the system automatically opens the document at the bookmark location. The system also permits the reviewing user to open another text box associated with the exception for inputting notes related to that exception. Computer security processes, for example permission values associated with the note file may be used to isolate the set of notes so saved so that the reviewing user, who may be a different party in the transaction, can avoid users associated with the other party, that is, the other side of the deal having access to them, but the reviewing user can keep track of the exceptions and their ultimate resolution, e.g. acceptable, legal issue, business issue, etc. In another embodiment, the exception table can have one or more columns associated with review of the exceptions. One column may be configured so that only users of one party may change the status of the exception in that column, and another column configured so that only users associated with the other party can input or change those status values. Furthermore, when displaying exception lists, the display can be customized so that the user requesting the exception list to be displayed, only sees the status flags that they have privilege to see.

Operating Environment: The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer platform device may be a laptop or desktop type of personal computer. It can also be a cell phone, smart phone or other handheld device. The precise form factor of the user's computer platform device does not limit the claimed invention. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface. The program can detect the relative location of the cursor when the mouse button is actuated, and interpret a command to be executed based on location on the indicated relative location on the display when the button was pressed. Similarly, the program can detect the location of a touch on the screen. The data file may be an HTML document, the program a web-browser program and the command a hyper-link that causes the browser to request a new HTML document from another remote data network address location. The data file may also contain scripts, which are computer program commands, which are executed by the browser. The data file may also contain references to objects stored either locally or remotely that the browser may then access and display or otherwise render. The browser can thereby fetch additional data that is stored on a remote server accessed using the Internet.

The Internet is a computer network that permits customers operating a personal computer to interact with computer servers located remotely and to view content that is delivered from the servers to the personal computer as data files over the network. In one kind of protocol, the servers present webpages that are rendered on the user's computer platform using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (10) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing platforms, systems, environments, and/or configurations that may be suitable for use with the invention include, but are not limited to, personal computers, server computers, hand-held, laptop, tablet or mobile computer or communications devices such as cell phones, smart phones and PDA's, multiprocessor systems, microprocessor-based systems, set top boxes, programmable consumer electronics, network PCs, minicomputers, mainframe computers, distributed computing environments that include any of the above systems or devices, and the like. These may operate using as an operating system Windows, iOS, OSX, Android, Linux, Unix, Symbian and Blackberry including the various versions and variants thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., a scripting language, like JAVA, Java Script, an assembly language, or a high-level language such as FORTRAN, C, C++). The source code may be compiled before execution and distributed as object code that is executed on the target computer or compiled as it is executed by the target computer, in each case for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A system comprising:
   a computing device having a stored catalog that includes
      a database with a plurality of documents that includes a first document and a second document, and
      a status tag, a plurality of authorized signatories, and a title for each document of the plurality of documents;
   a signature module configured to
      determine authenticity of a signature data item received from a user, the signature data item representing a signature of the user,
      identify at least one of the plurality of authorized signatories as being associated with the user,
      determine that the signature data item corresponds to at least one of the plurality of authorized signatories,
      update the database by storing a reference to the signature data item;
   the system being configured to transmit for display on a remote computer
      data representing a list of the plurality of documents, the list representing by the title each of the plurality of documents, and
      an indication representing a state of the status tag associated with the title;
   a user interface module that is adapted to receive a first reference, a first text item, and a second text item, the first reference being to the first document, the first text item including data specifying a first location reference within the first document;
   a data record associated with the first document and including data representing an exception, the data record including the first location reference and the second text item, the data record further including a second reference to the second document, the second reference being associated with the exception, the data record further including a bookmark to the first location reference; and
   an output module that generates an exception list document by automatically listing the contents of exception data records in an output document, the exception data records including the exception.

2. The system of claim 1, wherein the status tag represents one or more status states selected from a group consisting of a ready for execution status, an executed status, an original status, and a markup status.

3. The system of claim 1, wherein the signature module is further configured to:
   receive as input a selection of an authorized party associated with the signature data item, and
   in response to receiving the selection of the authorized party, update an applicable status tag to indicate that the authorized party has signed a respective one of the plurality of documents.

4. The system of claim 3, wherein the system is further configured to execute a query, the query determining which of the plurality of documents is not associated with at least one signature data item.

5. The system of claim 3, wherein the system is further configured to prevent uploading and storage of a signature data item designated as associated with an authorized party if a predetermined security protocol fails.

6. The system of claim 3, wherein the signature module is configured to prevent updating the status tag if a predetermined security protocol fails.

7. The system of claim 6, wherein the system is configured to execute a query, the query determining that all of the plurality of documents are associated with a "signed" status.

8. The system of claim 1, wherein the system is further configured to
store a meta-tag data that refers to the location of a corresponding signature data item and,
upon receiving an input, use the meta-tag data to generate a document file with signature pages of the plurality of documents.

9. The system of claim 8, wherein the system is further configured to determine a data set having a subset of the plurality of documents, the subset including only documents that are not associated with at least one signature data item.

10. The system of claim 1, wherein the data record includes a bookmark to a location reference within the second document.

11. The system of claim 1, wherein the output module is further adapted to
sort the exception list document according to location order in the first document; and
automatically format the output document to list exceptions in a sorted order.

12. The system of claim 1, further comprising a review module that is adapted to
receive a selection from a display of the first document;
use the selection to determine one exception of a plurality of exceptions; and
display text associated with the one exception.

13. The system of claim 12, wherein the review module is configured to
cause the user interface to display a hyperlink to the second document, and
in response to receiving a selection of the hyperlink, cause the second document to be displayed.

* * * * *